United States Patent [19]

Evezard et al.

[11] Patent Number: 5,314,043
[45] Date of Patent: May 24, 1994

[54] ELEVATOR AIR CORD TIGHTENING DEVICE

[75] Inventors: Jean-Michel A. Evezard; Christophe J. Taudou, both of Gien, France

[73] Assignee: Otis Elevator Company, Farmington, Conn.

[21] Appl. No.: 92,174

[22] Filed: Jul. 15, 1993

[51] Int. Cl.⁵ ............................................. B66B 13/08
[52] U.S. Cl. ..................................... 187/51; 187/1 A; 254/199; 474/101
[58] Field of Search ...................... 187/1 A, 51, 56, 57, 187/61; 254/199, 213; 49/116, 118, 122, 123; 474/113, 114, 117, 253, 255, 101

[56] References Cited

U.S. PATENT DOCUMENTS

| | | | |
|---|---|---|---|
| 2,318,090 | 5/1943 | McCormick | 187/51 X |
| 4,781,666 | 11/1988 | Acee, Sr. | 474/253 |
| 5,129,486 | 7/1992 | Steacy et al. | 187/61 X |

FOREIGN PATENT DOCUMENTS

| | | | |
|---|---|---|---|
| 1254291 | 1/1961 | France | 187/56 X |
| 1255542 | 9/1986 | U.S.S.R. | 187/1 A X |

*Primary Examiner*—D. Glenn Dayoan
*Assistant Examiner*—Dean A. Reichard
*Attorney, Agent, or Firm*—Lloyd D. Doigan

[57] ABSTRACT

A tensioning device for an elevator air cord that forms a loop has: a support having a relatively accessible first surface and a relatively inaccessible second surface; a holder on the second surface for fixedly holding a first end of the air cord; a tensioning device on said second surface for holding a second end of said air cord such that the tension of the loop of air cord may be adjusted; and key communicating between the first and second surfaces for manipulating the tensioning device to adjust the tension of the air cord loop.

9 Claims, 2 Drawing Sheets

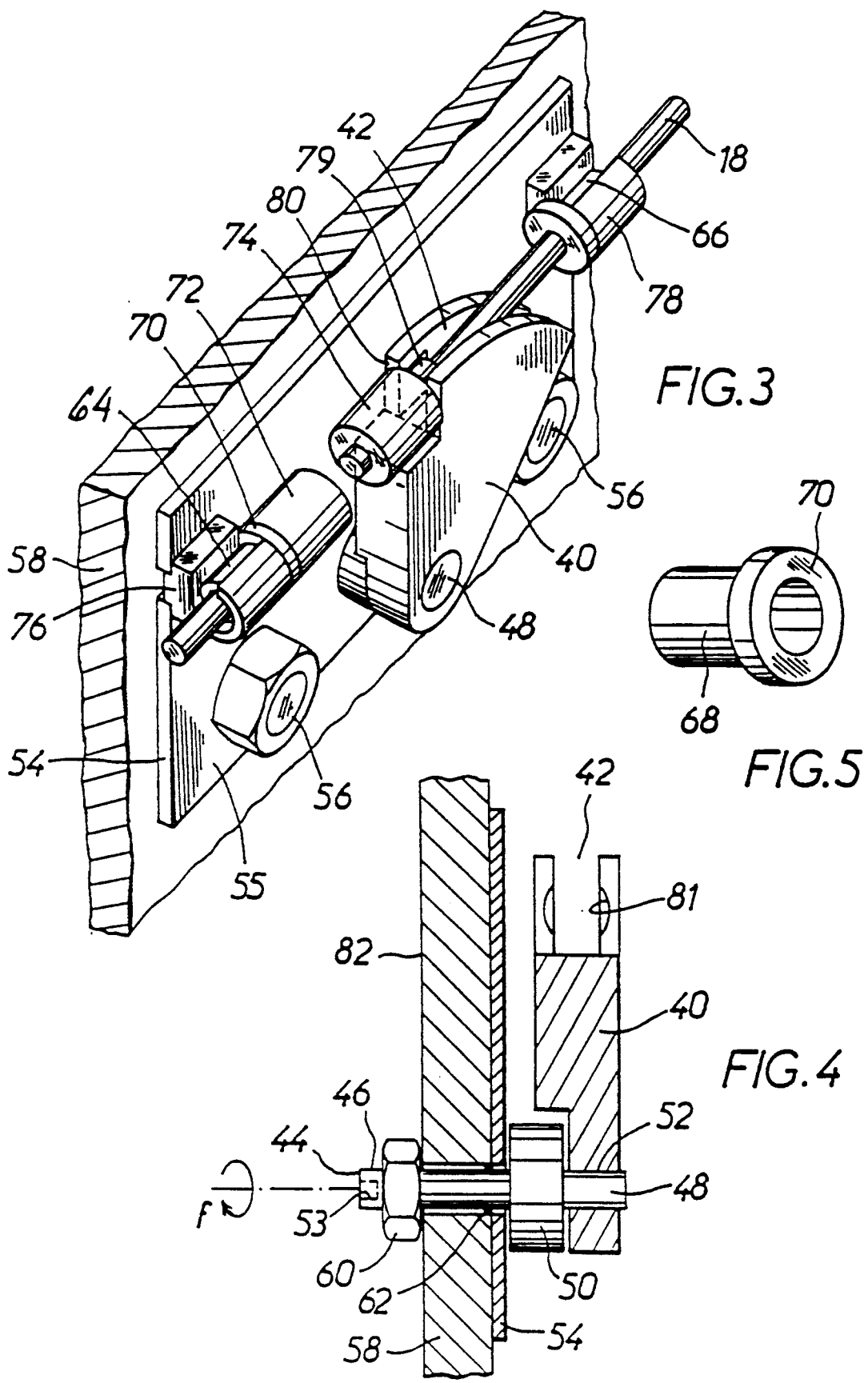

ELEVATOR AIR CORD TIGHTENING DEVICE

TECHNICAL FIELD

The present invention pertains to elevator doors and more particularly to a device for tightening an air cord connecting a pair of elevator doors.

BACKGROUND OF THE INVENTION

Elevator doors are suspended by rollers which ride on tracks. The doors are driven back and forth along the tracks and are connected by an air cord. The air cord forms a loop and is stretched between a pair of pulleys.

Since air cords tend to lose tension during use, it is important to be able to retension them. If the tension is too low, the doors could separate thereby breaking the safety chain of the elevator and causing the elevator car to stop.

To adjust the tension of the air cord, a device shown in FIG. 1 is used. This device has a vertical, rectangular support plate 12 having edges 14, 16 bent at a right angle through which the ends of air cord 18 pass. The air cord forms a loop around pulleys 20, 22. Springs 24, 26 are slipped over the two ends of the air cord. Sleeves 28, 30 are crimped over the ends of the air cord.

The springs 24, 26 are compressed between the edges and the sleeves to act as continuous tensioners. If the air cord stretches, the springs act to absorb the stretching, thus bringing the tension back to its nominal value.

The tension mechanism is attached to the rear surface of the support plate, a surface which is not visible by a mechanic working at a landing. The support plate itself is attached by means of bolts and nuts to the rear surface of a track for suspension of the doors (not shown).

Such an adjustment device has several disadvantages: the springs make noise because they rub on the sleeves and the edges of the support plate; if an exterior force greater than that exerted by the springs is applied to the air cord, it compresses the springs and therefore loosens the air cord, thus allowing separation of the doors; since the springs are short, they can only accommodate a slight lengthening of the air cord, and they therefore quickly become ineffective; and, once the lengthening has become too extensive, it is difficult to fix because the air cord is relatively inaccessible because it is mounted to the rear of the track.

DISCLOSURE OF THE INVENTION

It is an object of the invention to tension the air cord with a minimum of noise; to tension without the use of springs; to tension a severely stretched air cord; and to easily tension the air cord even if the ends of the cord are relatively inaccessible.

According to the invention, a tensioning device for an elevator air cord that forms a loop has: a support having a relatively accessible first surface and a relatively inaccessible second surface; a holder on the second surface for fixedly holding a first end of the air cord; a tensioning means on said second surface for holding a second end of said air cord such that the tension of said loop of air cord may be adjusted; and means communicating between the first and second surfaces for manipulating the tensioning means to adjust the tension of the air cord loop.

According further to the invention, the tensioning means is a cam which engages the second end of the air cord and swivels on the second surface to tension the loop. The means communicating from the first side to the second side for manipulating the cam is an axle that can be immobilized rotationally after the air cord is tensioned. The axle has a hexagonal or other suitable drive portion which cooperates with a tool to rotate the axle and tension the air cord. Rotation of the cam causes the ends of the air cord come closer to each other thereby tensioning the air cord.

The tensioning device has many advantages. Springs are eliminated thereby minimizing the noise of the device and expanding the lengthening ability of the device for a severely stretched air cord. Further the air cord may be tensioned even if the ends of the cord are relatively inaccessible.

The foregoing and other objects, features and advantages of the present invention will become more apparent in light of the following detailed description and accompanying drawings.

BRIEF DESCRIPTION OF THE DRAWINGS

FIG. 3 is a perspective view of the device of FIG. 2;

FIG. 4 is a cutaway view taken along line IV—IV of FIG. 2; and

FIG. 5 is perspective view of a fitting of FIG. 3.

BEST MODE FOR CARRYING OUT THE INVENTION

Figure 1:
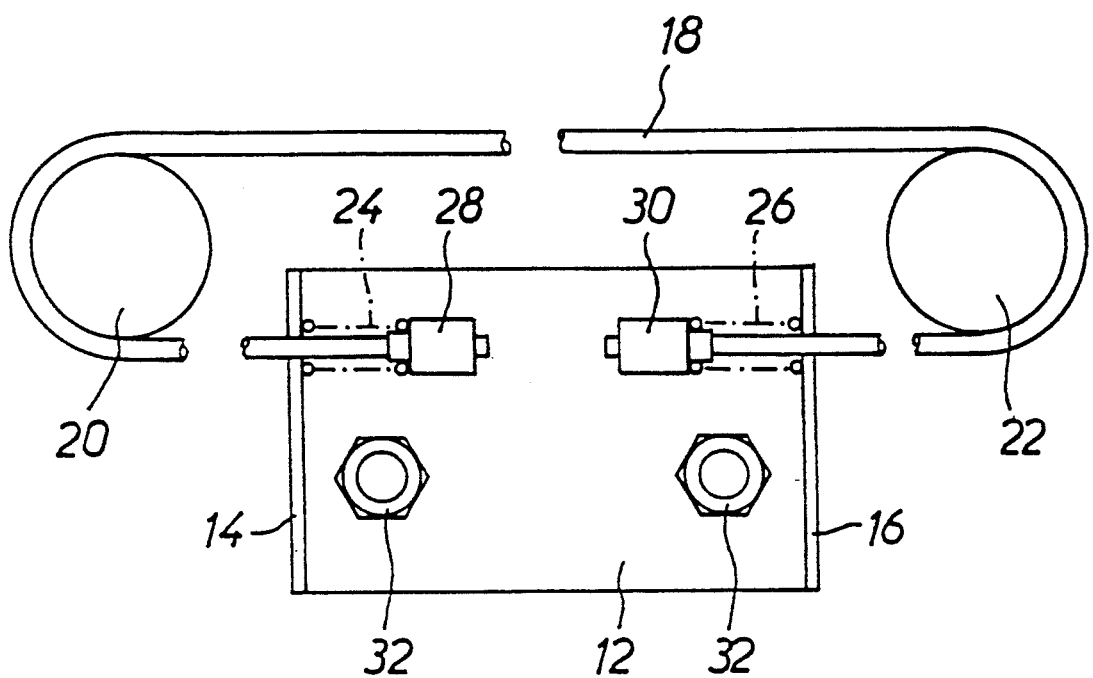
FIG. 1 is a front view of a prior art tension device.
Figure 2:
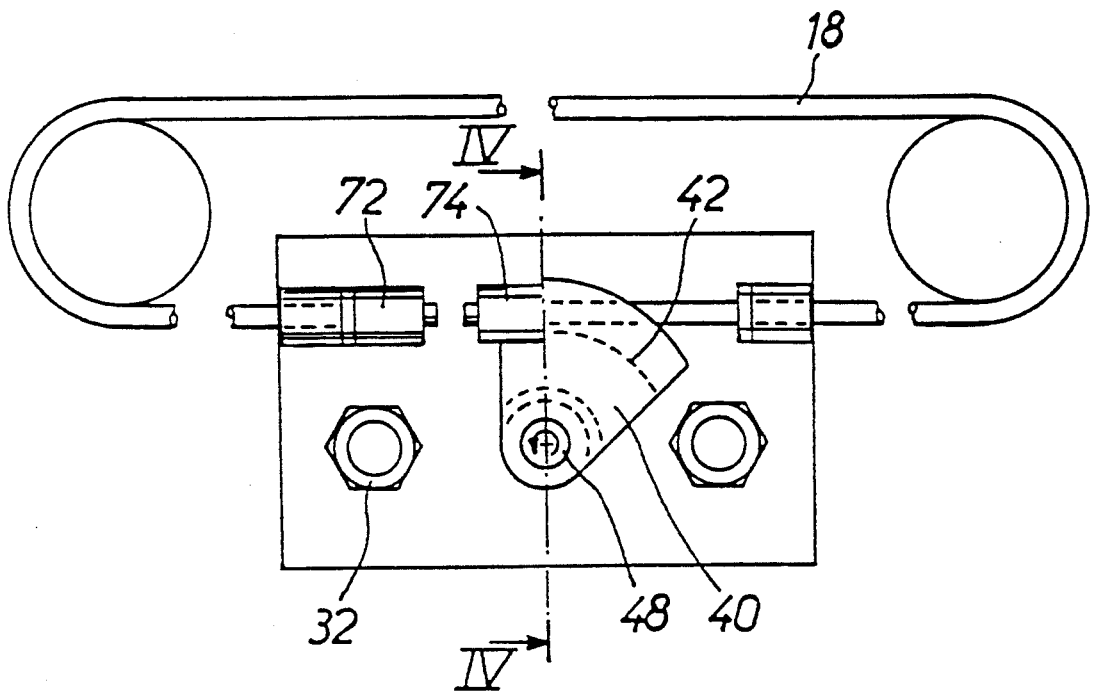
FIG. 2 is a front view of the tension device according to the invention.

Referring to FIGS. 2-4, the tension device forming cam 40 of the invention is shown. The cam 40 has a body and a pair of pie shaped flanges which form a groove 42. The body of the cam supports axle 44 which may be integral with the cam, but is shown in FIG. 4 as an independent part assembled therewith.

Both ends 46, 48 of the axle are threaded, and at an intermediate point in its length, the axle has cylindrical shoulder 50 of a greater diameter. End 48 is screwed into threaded hole 52 made in the cam. The other end 46 has hexagonal opening 53 for driving the axle by means of a tool (not shown).

Cam 40 and its axle 44 are mounted so as to swivel as one piece on rear surface 55 of vertical support plate 54, which is itself attached by means of bolts and nuts 56 to track 58 which serves to suspend the doors of an elevator (not shown). The axle passes through two aligned holes made in support plate 54 and track 58, respectively and its end 46 projects over the front surface of the track which is visible by an elevator mechanic. End 46 receives an adjusting nut 60 which allows one to immobilize cam 40 in an angular position.

Where it passes into support plate 54, the axle has an o-ring 62 which tends to keep the cam from rotating when nut 60 is loosened.

Air cord 18 for driving the doors forms an open loop, of which the ends of the air cords are attached on the rear surface of support plate 54. Over these ends are two annular fittings 64, 66 made of a material with a low coefficient of friction. As shown in FIG. 5, each fitting has tubular body 68 and an end flange 70. The interior passage of the body and the flange has a diameter which is greater than that of the air cord so that the fittings can slide freely over the ends.

After having slipped the fittings on the ends, sleeves 72, 74 are crimped over each respective end of the air cord. The end of the air cord which bears sleeve 72 is anchored to a hook 76 that is attached on the rear surface of support plate 54. This hook has a semi-cylindrical body, open laterally, and has an interior diameter equal to the exterior diameter of fitting 64. The width of the lateral opening is greater than the diameter of the air cord and less than the exterior diameter of flange 70 (see FIG. 5). Thus, in order to attach the left end of the air cord in FIG. 3, one places the air cord through the lateral opening of hook 76, slides fitting 64 on until it penetrates the hook, and pulls on the air cord until flange 70 abuts the hook. The fitting and the air cord no longer risk accidentally coming out of the hook.

The other fitting 66 is anchored in the same way as described above in a second hook 78 identical to hook 76, also attached on the rear surface of the support plate, and having the same axis as the first hook. In this case, sleeve 74 is not applied against fitting 66, but it is separated from it by a certain distance so as to leave a portion of the stripped air cord between them. The sleeve 74 is fastened to the cam and has on its rear surface a stud 79 which is received in two spaces 81 formed on the internal surfaces of the walls which define groove 42.

The cam 40 is preferably arranged so that when air cord 18 is correctly stretched, shoulder 80 and axle 44 are in the same vertical plane, as represented in FIG. 2.

An important characteristic of the invention lies in the fact that the adjustment of the tension of the air cord is done "blind" from front surface 82 of track 58, without touching the adjustment mechanism, which is in other respects inaccessible to the operator. When the air cord loosens, one loosens nut 60; then by means of a tool that one introduces in hexagonal opening 53, one rotates axle 44 in the clockwise direction (arrow f) in FIG. 4. In FIG. 2, this direction is the counterclockwise direction.

In this motion, the axle is only screwed further in cam 40, and it therefore moves the latter with it in rotation in the direction of arrow f. This rotation pulls on air cord 18 and stretches it. The arc of circle formed in groove 42 allows the air cord to be always tangent to the groove, and during rotation of the cam, the air cord is wound in the groove. When the desired tension is obtained, one immobilizes the axle in position by adjusting nut 60.

The tension given to the air cord in this way tends to draw cam 40 in the reverse direction of arrow f, which only tightens the cam on the axle and the axle on the adjusting nut. With the tightening of the assembly obtained, the cam cannot rotate in the direction of loosening under the action of the air cord. If the air cord becomes loosened because of normal functioning of the door, one retightens it as indicated in the preceding.

In a particular embodiment, a rotation by a quarter of a revolution corresponds to a air cord length on the order of 30 mm, which is amply sufficient to alleviate wear and tear of the air cord throughout the life of the elevator.

Although the invention has been shown and described with respect to a best mode embodiment thereof, it should be understood by those skilled in the art that various other changes, omissions and additions in the form and detail thereof may be made therein without departing from the spirit and scope of the invention. In particular, one of ordinary skill in the art will recognize that the tensioning device may be used to tension other cables in other environments.

We claim:

1. A device for adjusting the tension of an elevator air cord forming a loop, characterized by;
    a support having a relatively accessible first surface and a relatively inaccessible second surface;
    a holder on the second surface for holding a first end of the air cord;
    a tensioning means on said second surface for holding a second end of said air cord such that the tension of said loop of air cord may be adjusted by moving said second end towards said first end; and
    means communicating between the first and second surfaces for manipulating the tensioning means to move said second end towards said first end.

2. The device of claim 1 wherein said tensioning means is characterized by:
    a cam which engages the second end of the air cord and swivels on the second surface to move said second end towards said first end.

3. The device of claim 1 wherein said communicating means is characterized by:
    an axle, and
    means for immobilizing said axle rotationally after said second end is moved towards said first end.

4. The device of claim 3 wherein said communicating means is further characterized by:
    means disposed within said axle for cooperating with a means for manipulating said axle.

5. The device of according to claim 3, wherein said communicating means is further characterized by means for minimizing rotation of said axle if said means for immobilizing is inoperative.

6. The device according to claim 1 further characterized by each air cord having on each end thereof, a cylindrical fitting is slipped thereon, and a sleeve that is fixed thereon.

7. A device according to claim 6, further characterized by;
    a first hook for receiving one fitting and a second hook for receiving another fitting, each hook attaching to said second surface, said hooks being in the form of laterally open cylinders, and whose opening has a width which is greater than the diameter of the air cord, in order to allow for the passage of the air cord, but not the fittings, the axes of said hooks being aligned so that the ends of the air cord are in alignment with each other.

8. A device for adjusting the tension of a cable forming a loop, characterized by;
    a support having a relatively accessible first surface and a relatively inaccessible second surface;
    a holder on the second surface for holding a first end of the air cord;
    a tensioning means on said second surface for holding a second end of said air cord such that the tension of said loop of air cord may be adjusted by moving said second end towards said first end; and
    means communicating between the first and second surfaces for manipulating the tensioning means to move said second end towards said first end.

9. The device of claim 8 wherein said tensioning means is characterized by:
    a cam which engages the second end of the cable and swivels on the second surface to move said second end towards said first end.

* * * * *